(12) United States Patent
Dorbes

(10) Patent No.: US 10,114,125 B2
(45) Date of Patent: Oct. 30, 2018

(54) RECEIVER FOR A SATELLITE POSITIONING SYSTEM AND SATELLITE SIGNAL PROCESSING METHOD

(71) Applicant: STMicroelectronics (Grand Ouest) SAS, Delarue (FR)

(72) Inventor: Stephane Dorbes, Ruaudin (FR)

(73) Assignee: STMicroelectronics (Grand Ouest) SAS, Delarue (FR)

( * ) Notice: Subject to any disclaimer, the term of this patent is extended or adjusted under 35 U.S.C. 154(b) by 248 days.

(21) Appl. No.: 15/136,211

(22) Filed: Apr. 22, 2016

(65) Prior Publication Data
US 2017/0146666 A1 May 25, 2017

(30) Foreign Application Priority Data

Nov. 19, 2015 (FR) ..................... 15 61136

(51) Int. Cl.
*G01S 19/24* (2010.01)
*G01S 19/09* (2010.01)
*G01S 19/35* (2010.01)

(52) U.S. Cl.
CPC .............. *G01S 19/35* (2013.01); *G01S 19/24* (2013.01)

(58) Field of Classification Search
CPC ................................. G01S 19/09; G01S 19/24
USPC .............. 342/357.4, 357.46, 357.63, 357.71; 701/468
See application file for complete search history.

(56) References Cited

U.S. PATENT DOCUMENTS

| | | |
|---|---|---|
| 9,176,233 B2 | 11/2015 | Khalili et al. |
| 2006/0176215 A1 | 8/2006 | Dubash et al. |
| 2008/0119148 A1 | 5/2008 | Ray |
| 2011/0115672 A1 | 5/2011 | Lee |
| 2014/0176364 A1 | 6/2014 | Brauner |
| 2015/0133070 A1 | 5/2015 | Huang |

OTHER PUBLICATIONS

INPI Search Report and Written Opinion for FR 1561136 dated Sep. 27, 2016 (7 pages).
First Office Action from co-pending DE Appl. No. 102016108217.1 dated Oct. 25, 2016 (10 pages).

*Primary Examiner* — Dao L Phan
(74) *Attorney, Agent, or Firm* — Crowe & Dunlevy

(57) ABSTRACT

The receiver for a satellite positioning system includes at least one receive channel with an input stage configured to receive a satellite signals having different constellation frequencies belonging to one frequency band or to different frequency bands. The receive channel further includes a frequency transposition stage connected to the input stage (EE) and including a controllable local oscillator device configured to deliver different frequency transposition signals respectively adapted to the different constellation frequencies. A processing stage of the receive channel is connected to the frequency transposition stage and includes a control circuit configured to control the local oscillator device to sequentially and cyclically deliver the different frequency transposition signals.

10 Claims, 3 Drawing Sheets

RECEIVER FOR A SATELLITE POSITIONING SYSTEM AND SATELLITE SIGNAL PROCESSING METHOD

PRIORITY CLAIM

This application claims priority to French Application for Patent No. 1561136 filed Nov. 19, 2015, the disclosure of which is incorporated by reference.

TECHNICAL FIELD

Embodiments of the invention concern radio frequency receivers and, more particularly, radio frequency receivers usable, for example, in satellite positioning systems commonly referred to by the person skilled in the art using the acronym "GNSS" ("Global Navigation Satellite System").

Examples of such systems include: the American "Global Positioning System" (GPS), the Russian global satellite navigation system ("GLONASS", using the Russian acronym), the European positioning system called "GALILEO", the Chinese satellite positioning and navigation system called "COMPASS"/"BEIDOU", the regional positioning systems such as the Indian Regional Navigational Satellite System (IRNSS), the regional satellite positioning system which complements the GPS system ("Quasi-Zenith Satellite System" (QZSS)), and the satellite-based augmentation systems (SBAS), such as the "Wide Area Augmentation System" (WAAS), and the systems known by the acronyms EGNOS, MSAS, GAGAN, without these examples being limiting.

BACKGROUND

In general, a receiver for satellite positioning systems which is capable of receiving different multifrequency satellite signals from one or more satellite positioning systems as cited above must be designed to manage frequency bands having large frequency separations, for example greater than 400 MHz.

Generally speaking, a receiver of this type includes a radio frequency input stage (front end) comprising a plurality of dedicated input channels disposed in parallel. Each dedicated channel is designed to receive a satellite signal having a dedicated constellation frequency.

However, such a configuration of dedicated input channels complicates the design and increases the overall cost of the receiver.

SUMMARY

According to one embodiment, it is thus proposed to offer a low-cost and low-complexity technical solution for implementing a radio frequency receiver for a satellite positioning system.

According to one aspect, a receiver for a satellite positioning system is proposed. This receiver includes at least one receive channel, comprising: an input stage configured to receive a plurality of satellite signals having different constellation frequencies belonging to one frequency band or to different frequency bands, a frequency transposition stage connected to the input stage and comprising a controllable local oscillator device configured to deliver different frequency transposition signals respectively adapted to the different constellation frequencies or to the different frequency bands, and a processing stage connected to the frequency transposition stage and comprising control means configured to control the local oscillator device in such a way as to make it deliver the different frequency transposition signals sequentially and cyclically.

A local oscillator device of this type therefore allows the receiver to transpose and process the different satellite signals sequentially and cyclically, within one and the same receive channel.

In other words, whereas in the prior art a receive channel is dedicated to a single constellation frequency or to a single frequency band, transposed by a single frequency transposition signal, the receive channel according to this aspect is dedicated to a set of a plurality of different constellation frequencies which are respectively transposed sequentially by a set of a plurality of different frequency transposition signals delivered by the same controllable local oscillator device, for example comprising a fractional phase-locked loop, the divider value of which enables the appropriate transposition frequency to be selected.

These different constellation frequencies may belong to the same frequency band or to different frequency bands. In this latter case, each constellation frequency may belong to a different band or some frequencies may belong to the same frequency band, whereas others may belong to another or to a plurality of other frequency bands. In other words, the number of different frequency bands is not necessarily equal to the number of different constellation frequencies.

When the constellation frequencies belong to different bands, the transposition signals can be adapted to these different bands.

According to one embodiment, the processing stage comprises a filtering module connected to the output of the frequency transposition stage and having a variable bandwidth adapted, following transposition by each transposition signal, to the constellation frequencies or to the frequency bands of the transposed satellite signals. The control means are furthermore configured to choose the bandwidth of the filtering module as a function of the chosen transposition signal.

The processing stage includes, for example, an analog-to-digital conversion module connected to the output of the filtering module, and a digital processing module incorporating said control means.

Although this is not indispensable, the processing stage may furthermore advantageously include an automatic gain control (AGC) module connected between the filtering module and the analog-to-digital conversion module. This automatic gain control module notably enables a constant noise level to be maintained automatically at the input of the analog-to-digital conversion module.

The digital processing module may advantageously also comprise an acquisition block configured to perform acquisitions of the different transposed satellite signals and a tracking block configured to track the different acquired satellite signals. Furthermore, the acquisition block and the tracking block are advantageously controlled by the control means.

According to a different aspect, a satellite signal processing method is proposed, including, within the same receive channel: a reception of a plurality of satellite signals having different constellation frequencies belonging to one frequency band or to different frequency bands; a sequential and cyclical generation of different frequency transposition signals respectively adapted to the different constellation frequencies or to the different frequency bands; and frequency transpositions of the satellite signals on the basis of the adapted frequency transposition signals in such a way as to deliver transposed satellite signals sequentially and cyclically.

According to one embodiment, the method furthermore includes acquisitions of the different transposed satellite signals and a tracking of the different acquired satellite signals.

BRIEF DESCRIPTION OF THE DRAWINGS

Other advantages and characteristics of the invention can be found in the detailed description of embodiments, given by way of a non-limiting example and illustrated by the attached drawings, in which.

DETAILED DESCRIPTION

Figure 1:
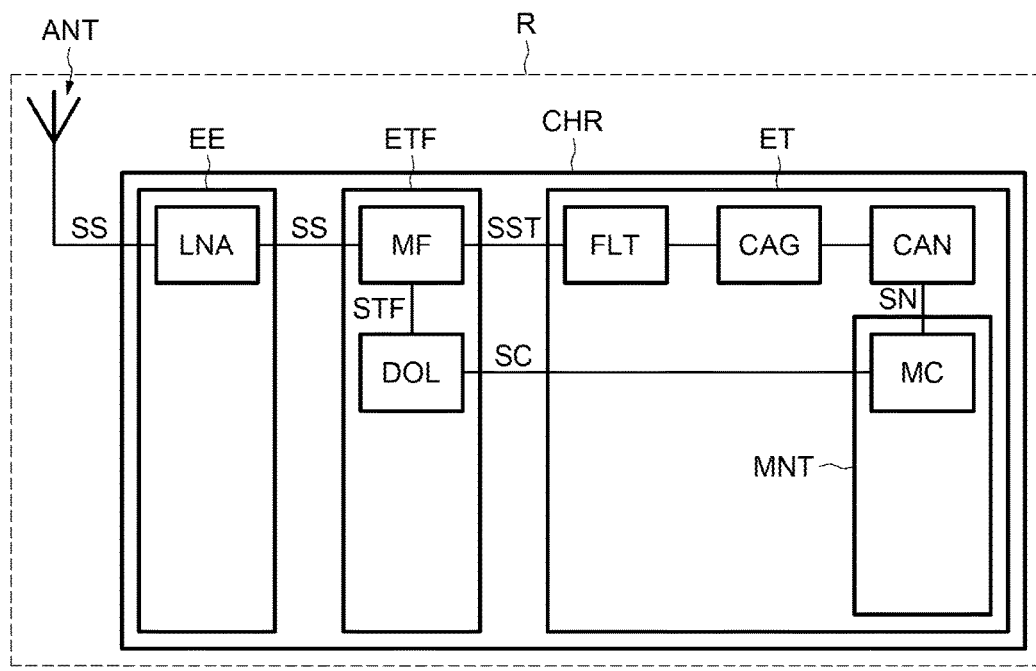
FIGS. 1 to 5 show schematically different aspects of the invention.

FIG. 1 shows a receiver R for a satellite positioning system that is capable of receiving satellite signals SS having different constellation frequencies originating from different satellite positioning systems, such as, for example, the "GPS", "GLONASS", "GALILEO", "COMPASS" or "BEIDOU", "IRNSS", "QZSS", and "WAAS" as cited above.

The receiver R includes an antenna ANT to receive the satellite signals SS.

In the example embodiment described here, the satellite signals SS belong to different frequency bands.

This antenna ANT is connected to a receive channel CHR.

This receive channel CHR includes an input stage EE comprising, for example, a low noise amplifier (LNA) connected to said antenna ANT.

The receive channel CHR furthermore includes a frequency transposition stage ETF connected to the input stage EE and comprising a controllable local oscillator device DOL and a frequency mixer MF, having, for example, a frequency image rejection structure known per se to the person skilled in the art.

The mixer MF receives the signal SS and transposes its frequency using a frequency transposition signal STF delivered by the local oscillator device DOL controllable by a control signal SC.

The local oscillator device DOL may, for example, be a fractional phase-locked loop (PLL) known per se to the person skilled in the art.

Figure 2:
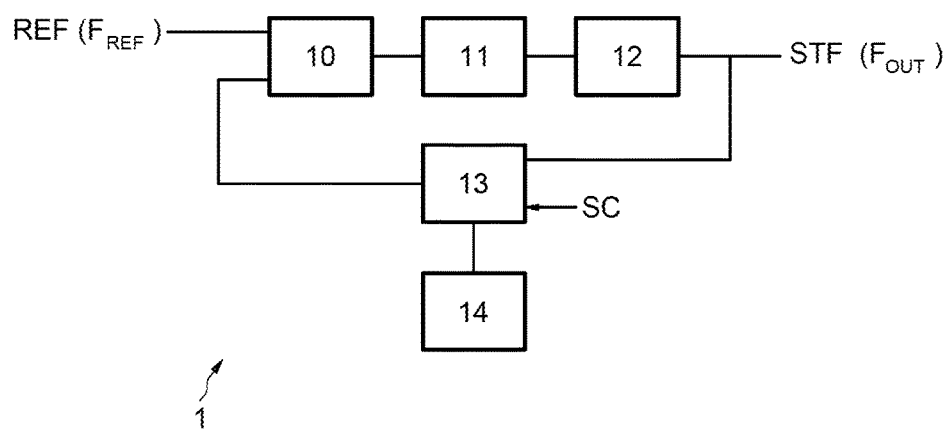

An example of a phase-locked loop 1 of this type is shown in FIG. 2.

The loop 1 comprises a phase comparator 10, receiving a reference signal REF, followed by a loop filter 11, itself followed by a local voltage-controlled oscillator 12 which delivers the frequency transposition signal STF.

The oscillator 12 is looped back onto the phase comparator 10 via a divide-by-N divider 13 furthermore connected to the output of a delta-sigma modulator 14.

The control signal SC allows the value of N to be adjusted.

The local oscillator device DOL is configured to deliver different frequency transposition signals STF to the frequency mixer MF, respectively adapted to the satellite signals SS of the different frequency bands.

In the case of a fractional phase-locked loop (FIG. 2), the frequency $F_{REF}$ of the reference signal REF is constant and the output frequency $F_{OUT}$, i.e. the frequency of the frequency transposition signal STF, is adjusted by regulating the value of the divider N.

The receiver R furthermore includes a processing stage ET connected to the frequency transposition stage ETF. The processing stage ET comprises a control circuit MC configured to control the local oscillator device DOL via the control signal SC.

It should be noted that each frequency transposition signal corresponds to a dedicated frequency band of satellite signals SS.

In this embodiment, the receiver is parameterized to receive satellite signals in different chosen frequency bands, for example the frequency bands:

L1 (1563 MHz-1587 MHz; central frequency approximately 1576 MHz);

L2 (1215 MHz-1239.6 MHz; central frequency approximately 1227 MHz); and

L5 (1164 MHz-1189 MHz; central frequency approximately 1176 MHz).

The receiver will therefore be able to receive and process satellite signals SS having different constellation frequencies belonging to these different bands, for example a GPS signal (constellation frequency of 1575.42 MHz) located in the band L1, a GPS signal (constellation frequency of 1227.6 MHz) located in the band L2 and a different satellite signal located in the band L5.

The frequencies of the different frequency transposition signals STF (and consequently, for example, the different values of the divider N in the case of a fractional phase-locked loop) are chosen from a set of frequencies stored in the receiver and adapted to these chosen frequency bands.

A signal STF having a frequency of 1571 MHz, for example, will also be chosen for the band L1.

A signal STF having a frequency of 1223 MHz, for example, will be chosen for the band L2, and a signal STF having a frequency of 1172 MHz, for example, will be chosen for the band L5.

These different frequency transposition signals STF are delivered sequentially and cyclically in order to take account of all the frequencies of the different satellite positioning systems corresponding to the chosen bands.

A sequential delivery of the signals STF is understood here as being a delivery of the signals STF following one another during a cycle and a cyclical delivery is understood as being a repetition of said cycle over time.

The frequency mixer MF is configured to perform a frequency transposition on the satellite signals SS on the basis of the adapted frequency transposition signals STF in such a way as to deliver transposed satellite signals SST.

In this example, the frequency transposition returns the transposed signals more or less to the baseband.

By analogy with the frequency transposition signals STF of the local oscillator device DOL, the transposed satellite signals SST are also delivered sequentially and cyclically.

Furthermore, the processing stage ET comprises a filtering module FLT connected to the output of the frequency transposition stage ETF, an analog-to-digital conversion module CAN connected to the output of the filtering module FLT, advantageously via an automatic gain control module CAG, and a digital processing module MNT incorporating said control circuit MC. The digital processing module can be implemented through software within a microprocessor and/or through hardware within an application specific integrated circuit (ASIC).

The filtering module FLT receives the transposed satellite signals SST delivered by the frequency mixer MF and performs a frequency filtering. The filtering module FLT has a variable bandwidth adapted to the frequency bands of the transposed satellite signals SST in such a way as to retrieve data sequentially and cyclically from the different satellite signals on the corresponding frequency bands and eliminate any signals located outside the corresponding band.

It should be noted here that the control circuit MC is furthermore configured to choose the bandwidth of the filtering module FLT while synchronizing this choice with the chosen transposition signal of the local oscillator device DOL.

The analog-to-digital conversion module CAN then converts the transposed satellite signals SST filtered by the filtering module FLT into digital signals SN ready for subsequent digital processing.

Figure 3:
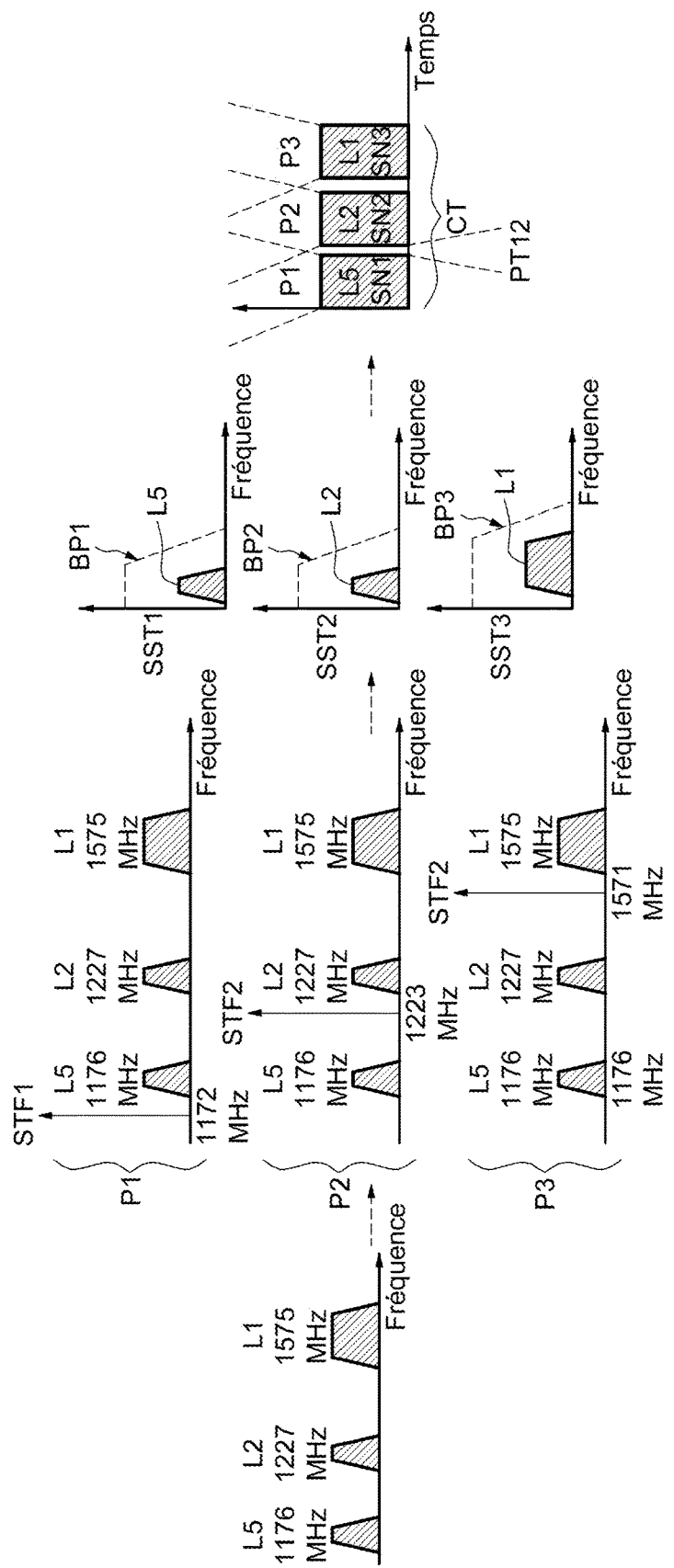

Reference is now made to FIG. 3 to illustrate schematically an example of the operation of the receiver shown in FIG. 1.

In an indicative but non-limiting manner, the receiver is parameterized to process satellite signals belonging to three different frequency bands: L5 (1176 MHz), L2 (1227 MHz) and L1 (1575 MHz).

In a first period P1, the local oscillator device DOL is controlled by the control circuit MC in such a way as to deliver a first frequency transposition signal STF1 dedicated to the frequency band L5, for example at 1172 MHz.

Following a frequency transposition performed by the frequency mixer MF, a first transposed satellite signal SST1 is obtained, having a low frequency (baseband). The bandwidth BP1 of the filtering module MF is chosen by the control means MC in order to recover the data from the transposed band L5.

The analog-to-digital conversion module CAN then performs an analog-to-digital conversion in order to obtain at its output a first digital signal SN1 corresponding to the data from the band L5.

It should be noted that a transitional period PT12 exists between the end of the first period P1 and the beginning of a second period P2. This transitional period PT12 is dedicated to the frequency switching of the local oscillator device DOL which will deliver a second frequency transposition signal STF2 adapted to the frequency band L2, for example at 1223 MHz.

In the same way, the receiver R recovers a second digital signal SN2 corresponding to the data from the band L2 in the second period P2. The bandwidth BP2 of the filtering module MF is different from the bandwidth BP1 and is adapted to recover the data from the transposed band L2.

By delivering a third frequency transposition signal STF3, for example at 1571 MHz, dedicated to the frequency band L1 in a third period P3, the receiver R recovers a third digital signal SN3 corresponding to the data from the band L1 at the output of the analog-to-digital conversion module CAN, following filtering with an adapted bandwidth BP3.

In this way, the module CAN delivers sequentially, in a processing cycle CT, the digital signals SN1 to SN3 corresponding to the satellite signals of the frequency band L5, L2 and L1 respectively. The period of the processing cycle CT can advantageously be set in the receiver R, for example at 1 second.

Figure 4:
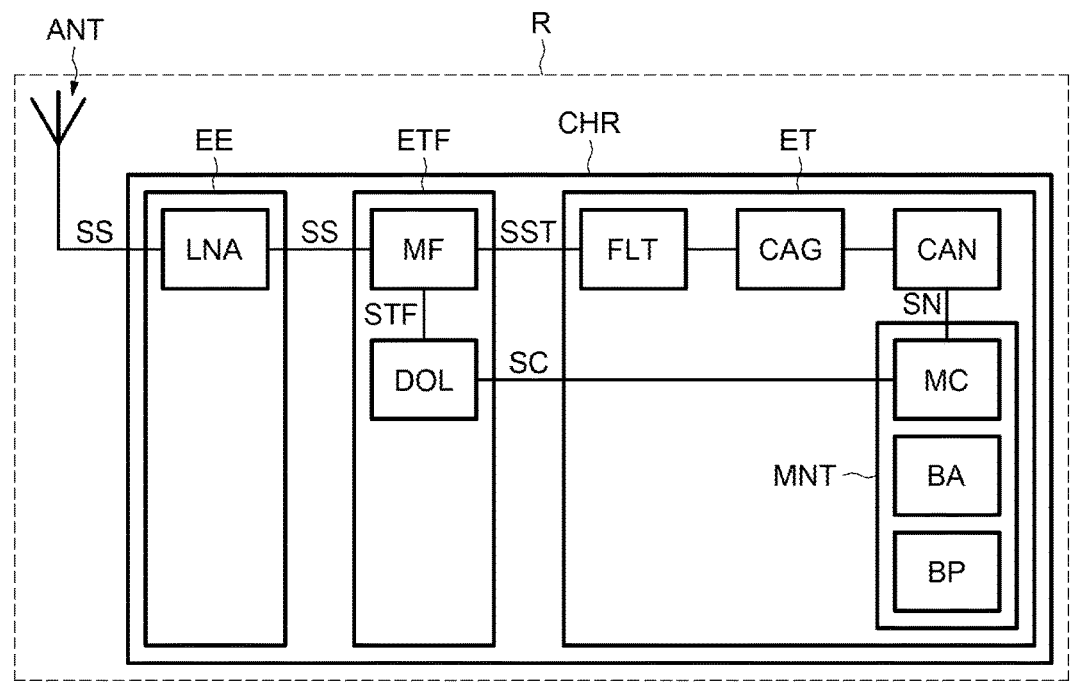

According to one embodiment, the digital processing module MNT may furthermore comprise an acquisition block BA and a tracking block BP, as shown in FIG. 4. The structure and the operation of these blocks are conventional.

The acquisition block BA is configured to perform acquisitions of the different transposed satellite signals during an acquisition phase in order to determine notably the satellites visible to the receiver R and the characteristics of the corresponding satellite signals, for example coarse/acquisition codes (C/A codes) for the GPS system.

The receiver R sequentially and periodically scans the different frequency bands respectively during the different periods, for example the periods P1 to P3 described above. The control circuit MC is also configured to manage the operation of the acquisition block BA in each period.

Figure 5:
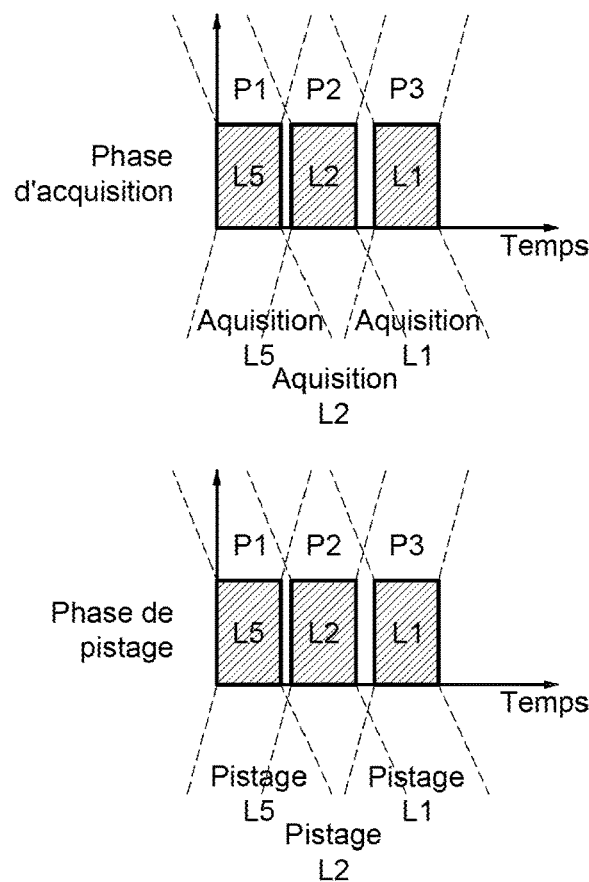

Once the satellite signals SS have been acquired, the acquisition phase is completed and the receiver R is switched to tracking mode and uses the tracking block BP. Since the tracking block BP is also controlled by the control means MC, it is therefore designed to track sequentially the satellite signals SS acquired in each period as shown in FIG. 5.

A receiver for a satellite positioning system is thus obtained which is capable of receiving satellite signals belonging to different frequency bands while using a single radio-frequency input channel provided with a frequency-switchable local oscillator device. The processing of satellite signals of different frequency bands is performed sequentially and cyclically over time. A receiver of this type advantageously has not only a reduced design complexity, but also a reduced overall manufacturing cost.

The invention is not limited to the embodiments which have just been described, but encompasses all variants thereof.

Thus, if many different frequency bands were to be taken into account, it would be possible to provide a plurality of receive channels respectively dedicated to different sets of different bands of different frequencies.

In other words, each receive channel would be dedicated to and capable of processing a set of a plurality of different frequency bands, the sets being different from one receive channel to another.

It would also be possible to have a plurality of receive channels respectively dedicated to the same set of frequency bands but using different frequency transposition signals.

More precisely, each channel could be dedicated to the bands L1, L2 and L5, each channel would use a frequency transposition signal for each band, adapted to said band, but the frequency of the frequency transposition signal used for a given band within a receive channel would be different from the frequency of the frequency transposition signal used for the same given band within a different receive channel.

It would also be possible to have one or more receive channels, each channel being allocated to the processing of different constellation frequencies but belonging to the same frequency band. Thus, a given channel would then use different frequency transposition signals respectively adapted to said different constellation frequencies of the frequency band concerned, for example the constellation frequency equal to 1575.42 MHz of the GPS system and the constellation frequency equal to 1561.098 MHz of the BEIDOU system, both belonging to the frequency band L1.

The invention claimed is:

1. A receive channel of a satellite receiver, comprising:
   an input stage configured to receive a plurality of satellite signals having different constellation frequencies belonging to different frequency bands,
   a frequency transposition stage connected to the input stage and comprising a controllable local oscillator device configured to deliver different frequency transposition signals respectively adapted to the different frequency bands so as to cause transposition of the plurality of satellite signals, and
   a processing stage connected to the frequency transposition stage and comprising a control circuit configured to control the controllable local oscillator device to deliver the different frequency transposition signals sequentially and cyclically, wherein the processing stage comprises a filtering module connected to an output of the frequency transposition stage and having a variable bandwidth adapted to the different frequency bands of the transposed satellite signals, the control circuit being configured to choose a bandwidth of the filtering module as a function of a current frequency transposition signal.

2. The receive channel according to claim 1, wherein the processing stage includes:

an analog-to-digital conversion module connected to an output of the filtering module, and a digital processing module incorporating said control circuit.

3. The receive channel according to claim 2, wherein the digital processing module further comprises:

an acquisition block configured to perform acquisitions of the different transposed satellite signals, and a tracking block configured to track the acquired transposed satellite signals, wherein the acquisition and tracking blocks are controlled by said control circuit.

4. A receive channel of a satellite receiver, comprising:

an input stage configured to receive a plurality of satellite signals having different constellation frequencies belonging to one frequency band, a frequency transposition stage connected to the input stage and comprising a controllable local oscillator device configured to deliver different frequency transposition signals respectively adapted to the different constellation frequencies within said one frequency band so as to cause transposition of the plurality of satellite signals, and a processing stage connected to the frequency transposition stage and comprising a control circuit configured to control the controllable local oscillator device to deliver the different frequency transposition signals sequentially and cyclically, wherein the processing stage comprises a filtering module connected to an output of the frequency transposition stage and having a variable bandwidth adapted to the constellation frequencies of the transposed satellite signals, the control circuit further configured to choose a bandwidth of the filtering module as a function of a current frequency transposition signal.

5. The receive channel according to claim 4, wherein the processing stage includes:

an analog-to-digital conversion module connected to an output of the filtering module, and a digital processing module incorporating said control circuit.

6. The receive channel according to claim 5, wherein the digital processing module further comprises:

an acquisition block configured to perform acquisitions of the transposed satellite signals, and a tracking block configured to track the acquired transposed satellite signals, wherein the acquisition and tracking blocks are controlled by said control circuit.

7. A satellite signal processing method, comprising the following steps performed within a same receive channel:

receiving a plurality of satellite signals having different constellation frequencies belonging to different frequency bands;

sequentially and cyclically generating different frequency transposition signals respectively adapted to the different frequency bands;

frequency transposing the satellite signals on the basis of the adapted frequency transposition signals in such a way as to sequentially and cyclically deliver transposed satellite signals; and filtering the transposed satellite signals, wherein a bandwidth of the filtering is selected as a function of a current adapted frequency transposition signal.

8. The method according to claim 7, further including:
acquiring the transposed satellite signals, and
tracking of the acquired transposed satellite signals.

9. A satellite signal processing method, comprising the following steps performed within a same receive channel:

receiving a plurality of satellite signals having different constellation frequencies belonging to one frequency band;

sequentially and cyclically generating different frequency transposition signals respectively adapted to the different constellation frequencies of the one frequency band;

frequency transposing the satellite signals on the basis of the adapted frequency transposition signals in such a way as to sequentially and cyclically deliver transposed satellite signals; and filtering the transposed satellite signals, wherein a bandwidth of the filtering is selected as a function of a current adapted frequency transposition signal.

10. The method according to claim 9, further including:
acquiring the transposed satellite signals, and
tracking of the acquired transposed satellite signals.

* * * * *

UNITED STATES PATENT AND TRADEMARK OFFICE
CERTIFICATE OF CORRECTION

PATENT NO. : 10,114,125 B2
APPLICATION NO. : 15/136211
DATED : October 30, 2018
INVENTOR(S) : Stephane Dorbes Page 1 of 1

It is certified that error appears in the above-identified patent and that said Letters Patent is hereby corrected as shown below:

In the Claims

At Claim 3, Column 7, Line 21, please delete the word "different".

Signed and Sealed this
Twenty-sixth Day of March, 2019

Andrei Iancu
*Director of the United States Patent and Trademark Office*